(12) United States Patent
Jeon et al.

(10) Patent No.: US 9,165,712 B2
(45) Date of Patent: Oct. 20, 2015

(54) MULTILAYER CERAMIC ELECTRONIC COMPONENT AND FABRICATION METHOD THEREOF

(75) Inventors: Byung Jun Jeon, Gyunggi-do (KR); Kyu Ha Lee, Gyunggi-do (KR); Hyun Hee Gu, Gyunggi-do (KR); Chang Hoon Kim, Gyunggi-do (KR); Myung Jun Park, Gyunggi-do (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 143 days.

(21) Appl. No.: 13/620,656

(22) Filed: Sep. 14, 2012

(65) Prior Publication Data

US 2013/0182368 A1 Jul. 18, 2013

(30) Foreign Application Priority Data

Jan. 18, 2012 (KR) ........................ 10-2012-0005750

(51) Int. Cl.
| | |
|---|---|
| *H01G 4/005* | (2006.01) |
| *H01G 4/30* | (2006.01) |
| *H01G 4/12* | (2006.01) |
| *H01G 4/01* | (2006.01) |
| *H01G 4/012* | (2006.01) |

(52) U.S. Cl.
CPC ................ *H01G 4/005* (2013.01); *H01G 4/12* (2013.01); *H01G 4/30* (2013.01); *H01G 4/01* (2013.01); *H01G 4/012* (2013.01); *Y10T 29/43* (2013.01)

(58) Field of Classification Search
None
See application file for complete search history.

(56) References Cited

U.S. PATENT DOCUMENTS

| | | | | |
|---|---|---|---|---|
| 2008/0081200 | A1* | 4/2008 | Katsube et al. | ............... 428/457 |
| 2009/0323253 | A1* | 12/2009 | Kobayashi et al. | ........ 361/301.4 |
| 2011/0235233 | A1* | 9/2011 | Ando et al. | ................ 361/301.4 |

FOREIGN PATENT DOCUMENTS

| | | |
|---|---|---|
| JP | 06-224073 A | 8/1994 |
| JP | 2008-112759 A | 5/2008 |

\* cited by examiner

*Primary Examiner* — Dion R Ferguson
(74) *Attorney, Agent, or Firm* — McDermott Will & Emery LLP (57) ABSTRACT

There is provided a multilayer ceramic electronic component including: a ceramic main body; a plurality of internal electrodes; and external electrodes formed on outer surfaces of the ceramic main body and electrically connected to the internal electrodes, wherein an average thickness of the external electrodes is 10 μm or less, and when a thickness of the external electrodes in a central portion of the ceramic main body in a thickness direction is Tc and a thickness of the external electrodes at a point spaced apart from a central portion of a capacitance formation region in a thickness direction by a distance equal to 25% of a thickness (S) of the capacitance formation region is T1, $0.8 \leq |T1/Tc| \leq 1.0$ is satisfied.

3 Claims, 4 Drawing Sheets

MULTILAYER CERAMIC ELECTRONIC COMPONENT AND FABRICATION METHOD THEREOF

CROSS-REFERENCE TO RELATED APPLICATIONS

This application claims the priority of Korean Patent Application No. 10-2012-0005750 filed on Jan. 18, 2012, in the Korean Intellectual Property Office, the disclosure of which is incorporated herein by reference.

BACKGROUND OF THE INVENTION

1. Field of the Invention

The present invention relates to a high capacitance multilayer ceramic electronic component having excellent reliability, while having thinner external electrodes, by reducing thickness deviations in the external electrodes.

2. Description of the Related Art

Recently, as electronic products have been reduced in size, multilayer ceramic electronic components have also been required to be reduced in size, yet have a large capacity.

Thus, various methods have been attempted to make dielectric layers and internal electrodes thinner and increasingly multilayered, and recently, multilayer ceramic electronic components in which an increased amount of thinned dielectric layers are laminated have been fabricated.

In addition, since external electrodes have also been required to become thinner, potentially causing a defect in which a plating solution infiltrates into a chip therethrough, it is difficult to reduce the size of the multilayered ceramic element.

In particular, when the shape of the external electrodes is not uniform, the possibility of the plating solution infiltrating a thinner portion thereof is further increased, resulting in a failure to secure reliability.

Thus, when a high capacitance product is relatively small, the shape of external electrodes thereof is a critical factor.

SUMMARY OF THE INVENTION

An aspect of the present invention provides a high capacitance multilayer ceramic electronic component having excellent reliability, while having thinner external electrodes, by reducing thickness deviations in the external electrodes.

According to an aspect of the present invention, there is provided a multilayer ceramic electronic component including: a ceramic main body; a plurality of internal electrodes laminated within the ceramic main body; and external electrodes formed on outer surfaces of the ceramic main body and electrically connected to the internal electrodes, wherein an average thickness of the external electrodes is 10 μm or less, and when a thickness of the external electrodes in a central portion of the ceramic main body in a thickness direction is Tc and a thickness of the external electrodes at a point spaced apart from a central portion of a capacitance formation region in a thickness direction in which the internal electrodes are laminated to contribute to capacitance formation by a distance equal to 25% of a thickness of the capacitance formation region of the ceramic main body is T1, $0.8 \leq |T1/Tc| \leq 1.0$ is satisfied.

When a thickness of a thinnest point of the external electrodes at edge portions of the ceramic main body is T3, $0.2 \leq |T3/Tc| \leq 1.0$ may be satisfied.

The external electrodes may include a 60 wt % or less of a conductive metal with regard to overall weight.

The conductive metal may be one or more selected from the group consisting of copper (Cu), nickel (Ni), silver (Ag), and silver-palladium (Ag—Pd).

According to another aspect of the present invention, there is provided a multilayer ceramic electronic component including: a ceramic main body; a plurality of internal electrodes laminated within the ceramic main body; and external electrodes formed on outer surfaces of the ceramic main body and electrically connected to the internal electrodes, wherein an average thickness of the external electrodes is 10 μm or less, and when a thickness of the external electrodes in a central portion of the ceramic main body in a thickness direction is Tc and a thickness of the external electrodes at an outermost internal electrode of the ceramic main body in which the internal electrodes are laminated to contribute to capacitance formation is T2, $0.5 \leq |T2/Tc| \leq 1.0$ is satisfied.

When a thinnest point of the external electrodes at edge portions of the ceramic main body is T3, $0.2 \leq |T3/Tc| \leq 1.0$ may be satisfied.

The external electrodes may include a 60 wt % or less of a conductive metal with regard to overall weight.

The conductive metal may be one or more selected from the group consisting of copper (Cu), nickel (Ni), silver (Ag), and silver-palladium (Ag—Pd).

According to another aspect of the present invention, there is provided a multilayer ceramic electronic component including: a ceramic main body; a plurality of internal electrodes laminated within the ceramic main body; and external electrodes formed on outer surfaces of the ceramic main body and electrically connected to the internal electrodes, wherein an average thickness of the external electrodes is 10 μm or less, and when a thickness of the external electrodes in a central portion of the ceramic main body in a thickness direction is Tc, a thickness of the external electrodes at a point spaced apart from a central portion of a capacitance formation region in a thickness direction in which the internal electrodes are laminated to contribute to capacitance formation by a distance equal to 25% of a thickness of the capacitance formation region of the ceramic main body is T1, and a thickness of the external electrodes at an outermost internal electrode of the ceramic main body in which the internal electrodes are laminated to contribute to capacitance formation is T2, $0.8 \leq |T1/Tc| \leq 1.0$, and $0.5 \leq |T2/Tc| \leq 1.0$ are satisfied.

When a thinnest point of the external electrodes at edge portions of the ceramic main body is T3, $0.2 \leq |T3/Tc| \leq 1.0$ may be satisfied.

The external electrodes may include 60 wt % or less of a conductive metal with regard to overall weight.

The conductive metal may be one or more selected from the group consisting of copper (Cu), nickel (Ni), silver (Ag) and silver-palladium (Ag—Pd).

According to another aspect of the present invention, there is provided a method of fabricating a multilayer ceramic electronic component, including: preparing a ceramic main body including dielectric layers and a plurality of first and second internal electrodes disposed to face each other, while having each of the dielectric layers interposed therebetween; preparing a conductive paste used for an external electrode, including a conductive metal; applying the conductive paste used for an external electrode to an end portion of the ceramic main body such that it is electrically connected to the internal electrodes; and firing the ceramic main body to form external electrodes, wherein an average thickness of the external electrodes is 10 μm or less, and when a thickness of the external electrodes in a central portion of the ceramic main body in a thickness direction is Tc and a thickness of the external electrodes at a point spaced apart from a central portion of a capacitance formation region in a thickness direction in which the internal electrodes are laminated to contribute to capacitance formation by a distance equal to 25% of a thickness of the capacitance formation region of the ceramic main body is T1, 0.8≤|T1/Tc|≤1.0 is satisfied.

When a thickness of the external electrodes at an outermost internal electrode of the ceramic main body in which the internal electrodes are formed is T2, 0.5≤|T2/TC|≤1.0 may be satisfied.

When a thinnest point of the external electrodes at edge portions of the ceramic main body is T3, 0.2≤|T3/Tc|≤1.0 may be satisfied.

The conductive metal may be one or more selected from the group consisting of copper (Cu), nickel (Ni), silver (Ag), and silver-palladium (Ag—Pd).

The external electrodes may include 60 wt % or less of a conductive metal with regard to overall weight.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 1:
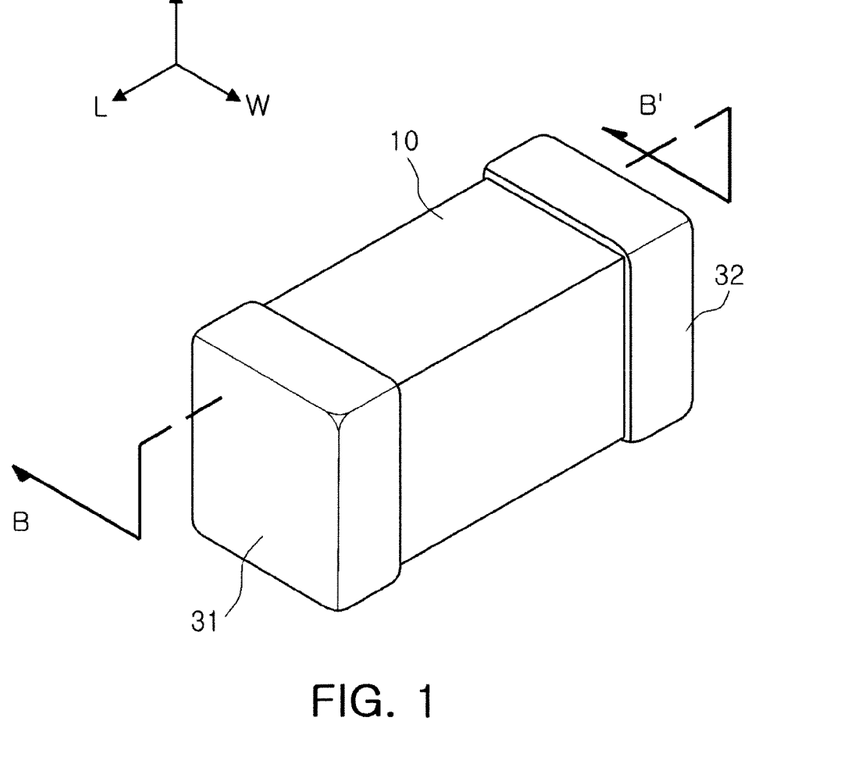
FIG. 1 is a perspective view schematically showing a multilayer ceramic capacitor (MLCC) according to first to third embodiments of the present invention.

FIG. 1 is a perspective view schematically showing a multilayer ceramic capacitor (MLCC) according to first to third embodiments of the present invention.

Figure 2:
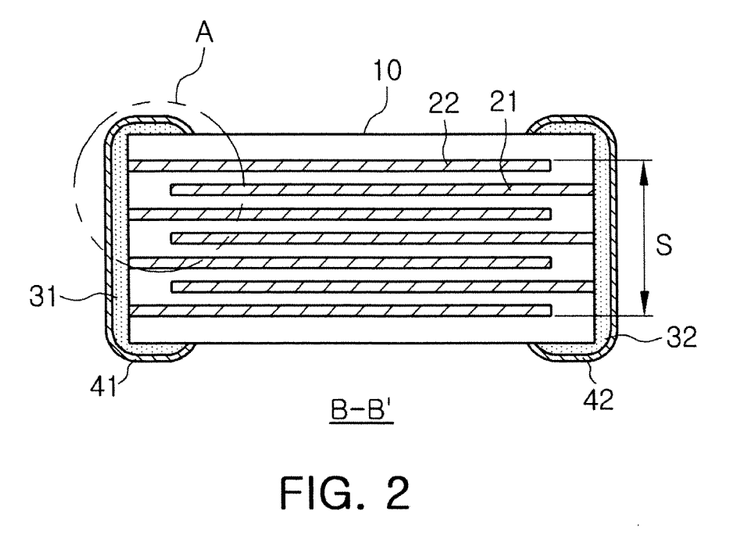
FIG. 2 is a sectional view taken along line B-B' in FIG. 1.

FIG. 2 is a sectional view taken along line B-B' in FIG. 1.

Figure 3:
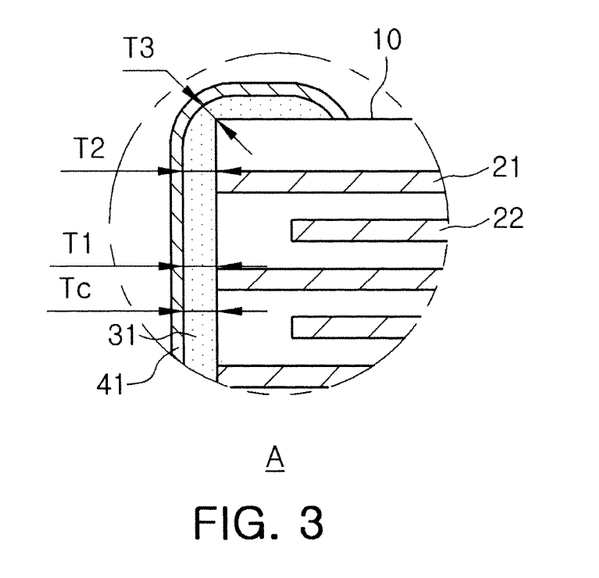
FIG. 3 is an enlarged view of portion 'A' in FIG. 2 according to the first embodiment of the present invention.

FIG. 3 is an enlarged view of portion 'A' in FIG. 2 according to the first embodiment of the present invention.

With reference to FIGS. 1 through 3, a multilayer ceramic electronic component according to the first embodiment of the present invention may include: a ceramic main body 10; a plurality of internal electrodes 21 and 22 laminated within the ceramic main body; and external electrodes 31 and 32 formed on outer surfaces of the ceramic main body 10 and electrically connected to the internal electrodes 21 and 22, wherein an average thickness of the external electrodes 31 and 32 is 10 µm or less, and when a thickness of the external electrodes 31 and 32 at a central portion of the ceramic main body 10 in a thickness direction is Tc and a thickness of the external electrodes 31 and 32 spaced apart from a central portion of a capacitance formation region in a thickness direction in which the internal electrodes 21 and 22 are laminated to contribute to capacitance formation by a distance equal to 25% of a thickness (S) of the capacitance formation region of the ceramic main body is T1, 0.8≤|T1/Tc|≤1.0 may be satisfied.

When a thinnest point of the external electrodes 31 and 32 at edge portions of the ceramic main body 10 is T3, 0.2≤|T3/Tc|≤1.0 may be satisfied.

The external electrodes 31 and 32 may include 60 wt % or less of a conductive metal with regard to overall weight.

The conductive metal may be one or more selected from the group consisting of copper (Cu), nickel (Ni), silver (Ag), and silver-palladium (Ag—Pd).

Hereinafter, the multilayer ceramic electronic component according to an embodiment of the present invention will be described, and in particular, a multilayer ceramic capacitor (MLCC) will be taken as an example of the multilayer ceramic electronic component, but the present invention is not limited thereto.

The ceramic main body 10 may have a rectangular parallelepiped shape.

Meanwhile, in the MLCC according to the present embodiment, it is defined that a 'length direction' is the 'L' direction, a 'width direction' is the 'W' direction, and a 'thickness direction' is the 'T' direction in FIG. 1. Here, the 'thickness direction' may have the same concept as a 'lamination direction' in which dielectric layers are stacked.

According to the first embodiment of the present invention, a raw material for forming the ceramic main body 10 is not particularly limited so long as sufficient capacitance is obtained. For example, the raw material may be a powder such as barium titanate ($BaTiO_3$).

As for the material of the ceramic main body 10, various materials such as a ceramic additive, an organic solvent, a plasticizer, a bonding agent, a dispersing agent, or the like, may be added to the powder such as barium titanate ($BaTiO_3$), or the like, according to the purpose of the present invention.

A material for forming the first and second inner electrodes 21 and 22 is not particularly limited. For example, the inner electrodes 21 and 22 may be formed by using a conductive paste formed of a material of one or more of silver (Ag), lead (Pb), platinum (Pt), nickel (Ni), and copper (Cu).

The MLCC according to the first embodiment of the present invention may include the external electrodes 31 and 32 electrically connected to the plurality of internal electrodes 21 and 22.

The external electrodes 31 and 32 may be electrically connected to the internal electrodes 21 and 22 to form capacitance.

According to the first embodiment of the present invention, an average thickness of the external electrodes 31 and 32 may be 10 µm or less, and when the average thickness exceeds 10 µm, since the external electrodes are relatively thick, reliability thereof is not impaired even in the case that there is a deviation in a thickness of the external electrodes.

With reference to FIGS. 2 and 3, when the thickness of the external electrodes 31 and 32 at a central portion of the ceramic main body 10 in a thickness direction is Tc and the thickness of the external electrodes 31 and 32 at a point spaced apart by 25% of the thickness (S) of the ceramic main body from a central portion of a capacitance formation region in a thickness direction in which the internal electrodes 21 and 22 are laminated to contribute to capacitance formation is T1, 0.8≤|T1/Tc|≤1.0 may be satisfied.

The thickness Tc of the external electrodes 31 and 32 at the central portion of the ceramic main body 10 in the thickness direction may refer to a thickness of the external electrodes 31 and 32 which is met when a virtual line is drawn in the length direction of the ceramic main body 10 starting from a central point of the ceramic main body 10 in the thickness direction.

Meanwhile, the central portion of a capacitance formation region in which the internal electrodes 21 and 22 are laminated to contribute to capacitance formation may refer to a central portion of the ceramic main body 10 in the thickness direction in the capacitance formation region.

The capacitance formation region may refer to a region in which the internal electrodes 21 and 22 are laminated within the ceramic main body 10.

The thickness T1 of the external electrodes 31 and 32 at a point spaced apart from the central portion of the capacitance formation region in the thickness direction in which the internal electrodes are laminated to contribute to capacitance formation by a distance equal to 25% of the thickness (S) of the capacitance formation region of the ceramic main body 10 may be a thickness of the external electrodes 31 and 32 which is met when a virtual line is drawn in the length direction of the ceramic main body 10 starting from the point.

According to the first embodiment of the present invention, Tc and T1 may satisfy a relationship of $0.8 \leq |T1/Tc| \leq 1.0$.

Since the ratio of $|T1/Tc|$ satisfies $0.8 \leq |T1/Tc| \leq 1.0$, a deviation between the thickness Tc of the external electrodes 31 and 32 at the central portion of the ceramic main body 10 in the thickness direction and the thickness T1 of the external electrodes 31 and 32, at the point away by 25% of the thickness (S) of the ceramic main body from the central portion of the capacitance formation region in which the internal electrodes 21 and 22 are laminated to contribute to capacitance formation, in the thickness direction of the capacitance formation region, may be reduced, thus preventing a degradation of reliability.

When the ratio of T1/Tc is less than 0.8, since the deviation of the thickness of the external electrodes 31 and 32 is relatively great, a plating solution may infiltrate into a thinner portion thereof to degrade reliability.

When a thinnest point of the external electrodes 31 and 32 at edge portions of the ceramic main body 10 is T3, $0.2 \leq |T3/Tc| \leq 1.0$ may be satisfied.

The thickness T3 of the thinnest portion of the external electrodes 31 and 32 at the edge portion of the ceramic main body 10 may refer to a thinnest point of the regions of the external electrodes 31 and 32 formed at the region of the edge portion of the ceramic main body 10.

Since the ratio of $|T3/Tc|$ satisfies $0.2 \leq |T3/Tc| \leq 1.0$, a deviation between the thickness Tc of the external electrodes 31 and 32 at the central region of the ceramic main body 10 in the thickness direction and the thickness T3 of the thinnest portion of the external electrodes 31 and 32 at the edge portion of the ceramic main body 10 may be reduced, thus preventing a degradation of reliability.

When the ratio $|T3/Tc|$ is less than 0.2, the deviation in thickness of the external electrodes 31 and 32 is relatively great to allow a plating solution to infiltrate into a thinner portion, degrading the reliability.

In order to measure the thickness of the external electrodes 31 and 32, as shown in FIG. 2, the thickness of the external electrodes 31 and 32 may be measured by scanning an image of a cross section of the MLCC in the length direction thereof by using a scanning electron microscope (SEM) as shown in FIG. 2.

In detail, with respect to an external electrode region extracted by scanning an image of a cross section of the MLCC, by the SEM, in a length and thickness direction (L-T) cut at the central portion of the MLCC in the width (W) direction as shown in FIG. 2, the thickness at each point of the external electrode cross-section may be measured.

The external electrodes 31 and 32 may be formed to include a conductive metal of the same material as that of the internal electrode, but the present invention is not limited thereto. For example, the conductive metal may be one or more selected from the group consisting of copper (Cu), nickel (Ni), silver (Ag), and silver-palladium (Ag—Pd).

The external electrodes 31 and 32 may be formed by applying a conductive paste prepared by adding glass frit to the conductive metal and then firing the same, and plated layers 41 and 42 may be additionally formed on the fired external electrodes 31 and 32.

As mentioned above, in the MLCC according to the first embodiment of the present invention, the external electrodes 31 and 32 may include a conductive metal contained to be 60 wt % or less with regard to overall weight in order to reduce the deviation between the thickness Tc of the external electrodes 31 and 32 at the central region of the ceramic main body 10 in the thickness direction and the thicknesses T1 and T3 at the respective points of the external electrodes 31 and 32.

In detail, according to the first embodiment of the present invention, since the external electrodes 31 and 32 include a conductive metal contained at 60 wt % or less with regard to overall weight, the thicknesses of the respective points of the external electrodes 31 and 32 satisfy relational expressions of $0.8 \leq |T1/Tc| \leq 1.0$ and $0.2 \leq |T3/Tc| \leq 1.0$.

Namely, since the conductive paste applied in the time of formation of the external electrodes 31 and 32 including 60 wt % or less of the conductive metal with regard to overall weight has physical properties of relatively low viscosity, the thickness of the applied conductive paste may be lowered and the deviation in thickness may be reduced in forming the external electrodes 31 and 32.

When the external electrodes 31 and 32 include a conductive metal by content exceeding 60 wt % with regard to overall weight, viscosity of the conductive paste applied in the time of formation of the external electrodes 31 and 32 may be increased to result in a failure of reducing the thickness of applied conductive paste and reducing the deviation in thickness, thereby lowering reliability.

Meanwhile, since the external electrodes are formed by using the conductive paste having low viscosity, the configuration of the external electrodes may not be uniform, and here, a method for allowing for the configuration of the external electrodes to be uniform is not particularly limited. For example, formation of a non-uniform region in the configuration of the external electrodes may be controlled to be relatively minimal by using an organic coating film that may be easily removed to obtain uniform external electrodes.

In the foregoing method, before forming the external electrodes 31 and 32 on the ceramic main body 10, an organic coating film that may be easily removed may be formed on the surface of the ceramic main body 10.

Next, a process of removing the organic coating film from a portion of the ceramic main body 10 on which the external electrodes 31 and 32 are formed may be performed.

And then, a process of applying a conductive paste to a surface of the ceramic main body 10 to form the external electrodes 31 and 32 may be performed.

Finally, the organic coating film may be removed from the surface of the ceramic main body 10 on which the external electrodes 31 and 32 are formed, thus removing the organic coating film, including a portion thereof onto which the conductive paste for the external electrodes attached on the organic coating film has flowed.

Figure 4:
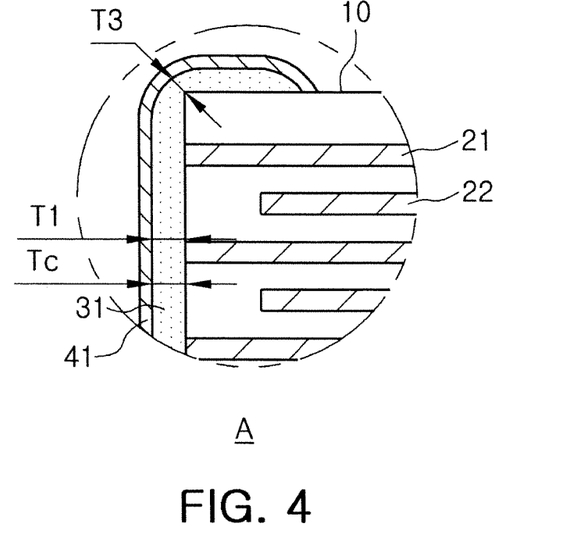
FIG. 4 is an enlarged view of portion 'A' in FIG. 2 according to the second embodiment of the present invention.

FIG. 4 is an enlarged view of portion 'A' in FIG. 2 according to the second embodiment of the present invention.

With reference to FIG. 4, the multilayer ceramic electronic component according to the second embodiment of the present invention may include: a ceramic main body 10; a plurality of internal electrodes 21 and 22 laminated within the ceramic main body 10; and external electrodes 31 and 32 formed on outer surfaces of the ceramic main body 10 and electrically connected to the internal electrodes 21 and 22, wherein an average thickness of the external electrodes 31 and 32 is 10 µm or less, and when a thickness of the external electrodes 31 and 32 at a central portion of the ceramic main body 10 in a thickness direction is Tc and a thickness of the external electrodes 31 and 32 at an outermost internal electrode of the ceramic main body 10 in which the internal electrodes 21 and 22 are laminated to contribute to capacitance formation is T2, $0.5 \leq |T2/Tc| \leq 1.0$ may be satisfied.

When a thinnest point of the external electrodes 31 and 32 at edge portions of the ceramic main body 10 is T3, $0.2 \leq |T3/Tc| \leq 1.0$ may be satisfied.

The external electrodes may include a 60 wt % or less of a conductive metal with regard to overall weight.

The conductive metal may be one or more selected from the group consisting of copper (Cu), nickel (Ni), silver (Ag), and silver-palladium (Ag—Pd).

A description of the same characteristics as those of the multilayered ceramic electronic component according to the first embodiment of the present invention will be omitted in the description of the second embodiment.

According to the second embodiment of the present invention, when the thickness of the external electrodes 31 and 32 at the outermost internal electrode of the ceramic main body in which the internal electrodes 21 and 22 are formed is T2, $0.5 \leq |T2/Tc| \leq 1.0$ may be satisfied.

The thickness T2 of the external electrodes 31 and 32 at at the outermost internal electrode of the ceramic main body 10 in which the internal electrodes 21 and 22 are laminated to contribute to capacitance formation may be a thickness of the external electrodes 31 and 32 which is met when a virtual line is drawn in the length direction of the ceramic main body 10 starting from the outermost internal electrode of the ceramic main body 10 in which the internal electrodes 21 and 22 are formed.

Since the ratio of $|T2/Tc|$ satisfies $0.5 \leq |T2/Tc| \leq 1.0$, a deviation between the thickness Tc of the external electrodes 31 and 32 at the central portion of the ceramic main body 10 in the thickness direction and the thickness T2 of the external electrodes 31 and 32 at the outermost internal electrode of the ceramic main body 10 in which the internal electrodes 21 and 22 are formed may be reduced, thus preventing a degradation of reliability.

When the ratio of $|T2/Tc|$ is less than 0.5, since the deviation of the thickness of the external electrodes 31 and 32 is relatively great, a plating solution may infiltrate into a thinner portion thereof to degrade reliability.

Figure 5:
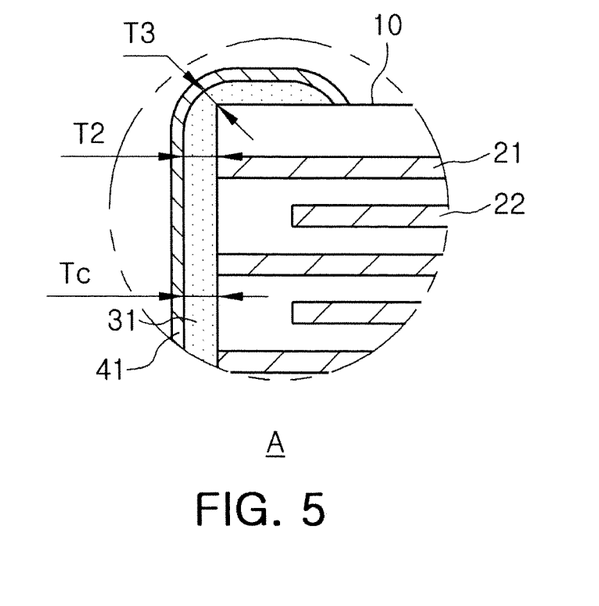
FIG. 5 is an enlarged view of portion 'A' in FIG. 2 according to the third embodiment of the present invention.

FIG. 5 is an enlarged view of portion 'A' in FIG. 2 according to the third embodiment of the present invention.

With reference to FIG. 5, the multilayer ceramic electronic component according to the third embodiment of the present invention may include: a ceramic main body 10; a plurality of internal electrodes 21 and 22 laminated within the ceramic main body 10; and external electrodes 31 and 32 formed on outer surfaces of the ceramic main body 10 and electrically connected to the internal electrodes 21 and 22, wherein an average thickness of the external electrodes 31 and 32 is 10 µm or less, and when a thickness of the external electrodes 31 and 32 at a central portion of the ceramic main body 10 in a thickness direction is Tc, a thickness of the external electrodes 31 and 32 at a point spaced apart from a central portion of a capacitance formation region in the thickness direction in which the internal electrodes are laminated to contribute to capacitance formation by a distance equal to 25% of a thickness (S) of the capacitance formation region of the ceramic main body 10 is T1, and a thickness of the external electrodes 31 and 32 at the outermost internal electrode of the ceramic main body 10 in which the internal electrodes 21 and 22 are formed is T2, $0.8 \leq |T1/Tc| \leq 1.0$, and $0.5 \leq |T2/Tc| \leq 1.0$ may be satisfied.

When a thinnest point of the external electrodes 31 and 32 at edge portions of the ceramic main body 10 is T3, $0.2 \leq |T3/Tc| \leq 1.0$ may be satisfied.

The external electrodes 31 and 32 may include 60 wt % or less of a conductive metal with regard to overall weight.

The conductive metal may be one or more selected from the group consisting of copper (Cu), nickel (Ni), silver (Ag), and silver-palladium (Ag—Pd).

Figure 6:
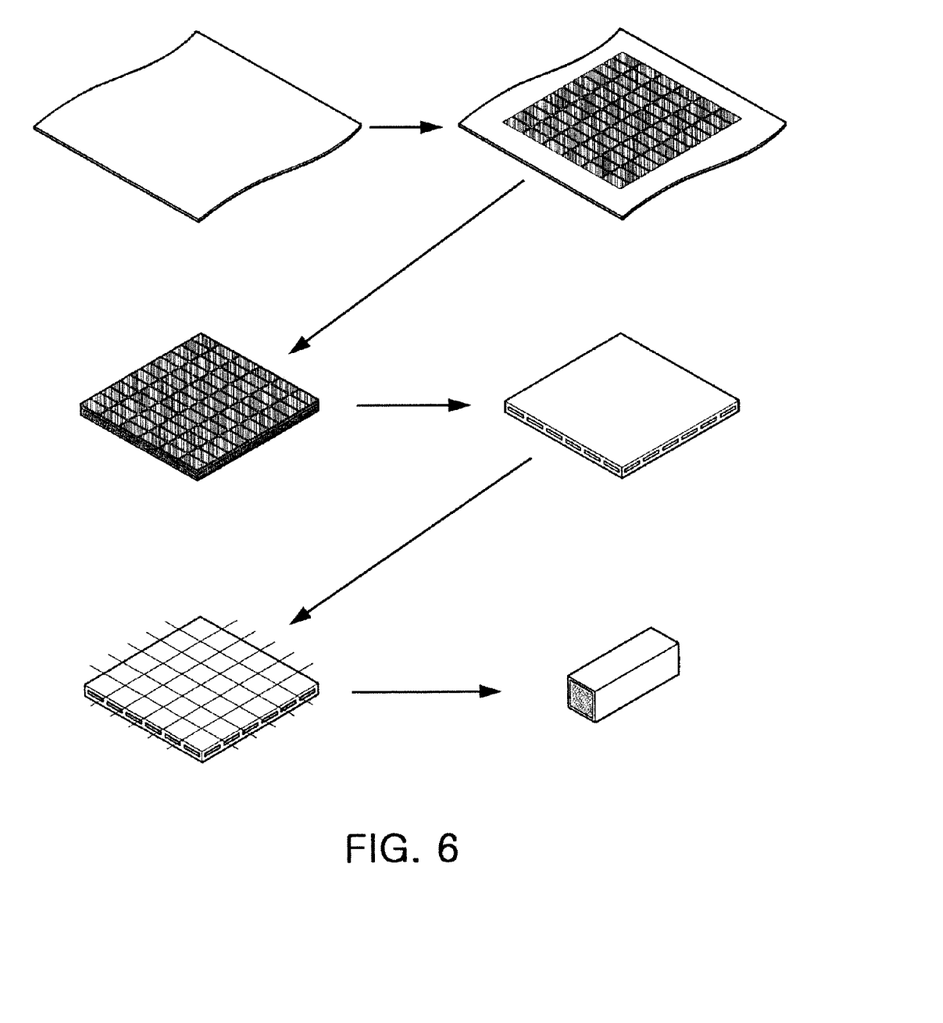
FIG. 6 is a view showing a fabrication process of an MLCC according to a fourth embodiment of the present invention.

FIG. 6 is a view showing a fabrication process of an MLCC according to a fourth embodiment of the present invention.

With reference to FIG. 6, a method of fabricating a multilayer ceramic electronic component according to the fourth embodiment of the present invention may include: preparing a ceramic main body including dielectric layers and a plurality of first and second internal electrodes disposed to face each other, while having each of the dielectric layers interposed therebetween; preparing a conductive paste used for an external electrode including a conductive metal; applying the conductive paste used for an external electrode to an end portion of the ceramic main body such that it is electrically connected to the internal electrodes; and firing the ceramic main body to form external electrodes, wherein an average thickness of the external electrodes is 10 µm or less, and when a thickness of the external electrodes in a central portion of the ceramic main body in a thickness direction is Tc and a thickness of the external electrodes at a point spaced apart from a central portion of a capacitance formation region in the thickness direction in which the internal electrodes are laminated to contribute to capacitance formation by a distance equal to 25% of a thickness (S) of the capacitance formation region of the ceramic main body 10 is T1, 0.8≤|T1/Tc|≤1.0 may be satisfied.

In the multilayer ceramic electronic component fabricated according to the method of fabricating a multilayer ceramic electronic component according to the fourth embodiment of the present invention, an average thickness of the external electrodes is 10 μm or less, and when a thickness of the external electrodes in a central portion of the ceramic main body in a thickness direction is Tc and a thickness of the external electrodes at a point spaced apart from a central portion of a capacitance formation region in the thickness direction in which the internal electrodes are laminated to contribute to capacitance formation by a distance equal to 25% of a thickness (S) of the capacitance formation region of the ceramic main body 10 is T1, 0.8≤|T1/Tc|≤1.0 may be satisfied.

Thus, since the deviation between the thicknesses of the external electrodes is reduced, even in a case in which the thickness of the external electrodes is reduced, a multilayer ceramic electronic component having excellent reliability may be implemented.

Other characteristics of the multilayer ceramic electronic component according to the fourth embodiment of the present invention rather than the foregoing characteristics are the same as those of the multilayer ceramic electronic components according to the first to third embodiments of the present invention and the method of fabricating the multilayer ceramic electronic component according to the fourth embodiment of the present invention is the same as a general fabrication method, so a description thereof will be omitted.

The present invention will be described in more detail through examples, but the present invention is not limited thereto.

The Embodiment Examples were performed to test a high temperature accelerated aging and reliability enhancement according to the relationship between the thicknesses Tc, T1, T2, and T3 of respective points of external electrodes with regard to a multilayer ceramic capacitor (MLCC) including the external electrodes having an average thickness of 10 μm or less.

The MLCC according to the Embodiment Examples was fabricated through the following operations.

First, slurry including a powder such as barium titanate ($BaTiO_3$), or the like, was applied on a carrier film and then dried to prepare a plurality of ceramic green sheets, whereby dielectric layers were formed.

Next, a conductive paste for internal electrodes, including nickel particles having an average size of 0.05 to 0.2 μm, was prepared.

The conductive paste for internal electrodes was applied to the plurality of ceramic green sheets through a screen printing method in order to form internal electrodes, and fifty internal electrodes were laminated to form a laminate.

Thereafter, the lamination was compressed and cut to generate a chip having a 0603 standard size, and the chip was fired at a temperature ranging from 1050° C. to 1200° C. under a reduced atmosphere of $H_2$ equal to or less than 0.1%.

And then, external electrodes were formed by using a conductive paste used for an external electrode including a conductive metal and glass frit, and then subjected to a process such as plating or the like, to fabricate an MLCC.

Meanwhile, the Comparative Example was a general MLCC and was fabricated in the same manner, except that the ratio between the thicknesses Tc, T1, T2, and T3 of the respective points of the external electrodes was outside of a numerical value range of the present invention.

In the following Table 1, reliability was compared according to the average thickness of the external electrodes of the MLCC.

The reliability was determined under the conditions that a temperature was 85° C., humidity was 85%, voltage of 1.5 Vr was applied, and testing was performed for one hour. O indicates good and X indicates poor.

TABLE 1

| | Average thickness of external electrode (μm) | Tc (μm) | T1 (μm) | T2 (μm) | T3 (μm) | T1/Tc | T2/Tc | T3/Tc | Determination of reliability |
|---|---|---|---|---|---|---|---|---|---|
| *1 | 10 | 10 | 7.6 | 3.5 | 1.1 | 0.76 | 0.35 | 0.11 | X |
| *2 | 12 | 12 | 8.2 | 2.9 | 0.9 | 0.68 | 0.24 | 0.08 | O |
| *3 | 14 | 14 | 9.9 | 2.9 | 1.8 | 0.71 | 0.21 | 0.13 | O |

With reference to Table 1, the sample 1 is a case in which the average thickness of the external electrodes was 10 μm. When sample 1 is out of the numerical value range of the present invention, since the average thickness of the external electrode is relatively small, reliability may be problematic.

In comparison, samples 2 and 3 are cases in which the average thickness of the external electrode was 10 μm or more. Although samples 2 and 3 are out of the numerical value range of the present invention, since the average thickness of the external electrode is relatively great, there is no problem with reliability.

Thus, it may be seen that when the average thickness of the external electrode of the multilayer ceramic electronic component according to an embodiment of the present invention is 10 μm or less, the reliability is affected according to whether or not the numerical value range of the present invention is satisfied.

In the following Table 2, when an average thickness of external electrodes of a chip having a 0603 standard size was 10 μm or less, reliability enhancement according to the ratio between thicknesses Tc, T1, T2, and T3 at the respective points of the external electrode was compared.

TABLE 2

| Average thickness of external electrode (μm) | Tc (μm) | T1 (μm) | T2 (μm) | T3 (μm) | T1/Tc | T2/Tc | T3/Tc | Determination of reliability |
|---|---|---|---|---|---|---|---|---|
| 4 | 6 | 6 | 5.1 | 3.8 | 1.5 | 0.85 | 0.63 | 0.25 | ○ |
| 5 | 8 | 8 | 6.9 | 4.6 | 2.3 | 0.86 | 0.58 | 0.29 | ○ |
| 6 | 10 | 10 | 8.4 | 5.2 | 3.1 | 0.84 | 0.52 | 0.31 | ○ |
| 7 | 6 | 6 | 4.9 | 3.4 | 1.4 | 0.82 | 0.57 | 0.23 | ○ |
| 8 | 8 | 8 | 6.5 | 4.2 | 1.9 | 0.81 | 0.53 | 0.24 | ○ |
| 9 | 10 | 10 | 8.2 | 4.5 | 2.3 | 0.82 | 0.45 | 0.23 | ○ |
| 10 | 6 | 6 | 4.8 | 3.1 | 1.3 | 0.80 | 0.52 | 0.22 | ○ |
| 11 | 8 | 8 | 6.7 | 4.3 | 2.1 | 0.84 | 0.54 | 0.26 | ○ |
| 12 | 10 | 10 | 8.2 | 4.2 | 2.5 | 0.82 | 0.42 | 0.25 | ○ |
| *13 | 6 | 6 | 4.8 | 2.9 | 0.9 | 0.80 | 0.48 | 0.15 | X |
| *14 | 8 | 8 | 6.0 | 3.2 | 0.9 | 0.75 | 0.40 | 0.11 | X |
| *15 | 10 | 10 | 7.6 | 3.5 | 1.1 | 0.76 | 0.35 | 0.11 | X |
| *16 | 7 | 7 | 5.1 | 3.1 | 0.9 | 0.73 | 0.44 | 0.13 | X |
| *17 | 9 | 8 | 5.8 | 3.6 | 1.8 | 0.73 | 0.45 | 0.23 | X |

Wait — the table headers show 9 data columns but I need to re-check. Columns: Average thickness, Tc, T1, T2, T3, T1/Tc, T2/Tc, T3/Tc, Determination. That's 9. But my rows have 10 values. Let me recount row 1: 4, 6, 6, 5.1, 3.8, 1.5, 0.85, 0.63, 0.25, ○ — that's 10. So there's an extra column. Looking again — T3 column has 1.5, then T1/Tc is 0.85. The values 1.5, 2.3, 3.1, 1.4... these are T3 values. Then T1/Tc=0.85 etc. So Avg=4, Tc=6, T1=6, T2=5.1, T3=3.8... no wait that gives 10 values with 9 headers.

Let me recount headers: "Average thickness of external electrode (μm)", "Tc (μm)", "T1 (μm)", "T2 (μm)", "T3 (μm)", "T1/Tc", "T2/Tc", "T3/Tc", "Determination of reliability" = 9 columns. Row 1 values: 4, 6, 6, 5.1, 3.8, 1.5, 0.85, 0.63, 0.25, ○ = 10 items. Hmm, one is sample number perhaps. Actually the leftmost column is likely a sample number (unlabeled), and "Average thickness" starts at 6. So: Sample=4, Avg=6, Tc=6, T1=5.1, T2=3.8, T3=1.5, T1/Tc=0.85, T2/Tc=0.63, T3/Tc=0.25. That makes more sense.

As may be seen in Table 2, the reliability of samples 4 to 12, i.e., Embodiment Examples of the present invention in which the average thickness of external electrodes was 10 μm or less and the numerical value ranges of 0.8≤|T1/Tc|≤1.0, 0.5≤|T2/Tc|≤1.0, and 0.2≤|T3/Tc|≤1.0 were satisfied, was enhanced.

In comparison, in the case of samples 13 to 17, i.e., Comparative Examples, it may be seen that the average thickness of external electrodes was 10 μm or less, and when cases 13 to 17 were outside of the foregoing numerical value range of the present invention, reliability was degraded.

In conclusion, it may be seen that, according to Embodiment Examples, reliability may be enhanced by adjusting the deviation between the thicknesses of the respective points of the external electrodes.

In detail, the high capacitance multilayer ceramic electronic component having excellent reliability may be implemented by forming the external electrodes such that the numerical value ranges of 0.8≤|T1/Tc|≤1.0, 0.5≤|T2/Tc|≤1.0, and 0.2≤|T3/Tc|≤1.0 are satisfied.

As set forth above, according to embodiments of the invention, the high capacitance multilayer ceramic electronic component having excellent reliability may be implemented by reducing the deviation between thicknesses of external electrodes even in a case in which it has relatively thin external electrodes.

While the present invention has been shown and described in connection with the embodiments, it will be apparent to those skilled in the art that modifications and variations may be made without departing from the spirit and scope of the invention as defined by the appended claims.

What is claimed is:

1. A multilayer ceramic electronic component comprising:
a ceramic main body;
a plurality of internal electrodes laminated within the ceramic main body;
external electrodes formed on outer surfaces of the ceramic main body and electrically connected to the internal electrodes at opposing side surfaces of the ceramic main body extending along a thickness direction in which the internal electrodes are laminated, the external electrodes extending along the entire opposing side surfaces in the thickness direction and a portion of opposing upper and lower surfaces at the ends of the ceramic main body in the thickness direction; and
plating layers disposed on outer surfaces of the external electrodes,
wherein the external electrodes comprise a same material disposed on the opposing side surfaces and the opposing upper and lower surfaces,
the external electrodes have an average thickness of 10 μm or less, and
when a thickness of the external electrodes in a central portion of the ceramic main body in a thickness direction is Tc and a thickness of the external electrodes at a point spaced apart from a central portion of a capacitance formation region in a thickness direction in which the internal electrodes are laminated to contribute to capacitance formation by a distance equal to 25% of a thickness of the capacitance formation region of the ceramic main body is T1, 0.8≤|T1/Tc|<1.0 is satisfied;
wherein when the thinnest point of the external electrodes at edge portions of the ceramic main body is T3, 0.2<|T3/Tc|<1.0 is satisfied; and
when a thickness of the external electrodes in a central portion of the ceramic main body in a thickness direction is Tc and a thickness of the external electrodes at an outermost internal electrode of the ceramic main body in which the internal electrodes are laminated to contribute to capacitance formation is T2, 0.5≤|T2/Tc|<1.0 is satisfied.

2. The multilayer ceramic electronic component of claim 1, wherein the external electrodes include 60 wt % or less of a conductive metal with regard to overall weight.

3. The multilayer ceramic electronic component of claim 2, wherein the conductive metal is one or more selected from the group consisting of copper (Cu), nickel (Ni), silver (Ag), and silver-palladium (Ag—Pd).

* * * * *